United States Patent
Sanada et al.

(10) Patent No.: US 6,573,864 B2
(45) Date of Patent: Jun. 3, 2003

(54) RECEIVER

(75) Inventors: Yukitoshi Sanada, Tokyo (JP); Masayoshi Abe, Tokyo (JP); Ryuji Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/055,441

(22) Filed: Oct. 23, 2001

(65) Prior Publication Data

US 2002/0140601 A1 Oct. 3, 2002

(30) Foreign Application Priority Data

Oct. 24, 2000 (JP) ........................................ 2000-324773

(51) Int. Cl.[7] .............................. G01S 3/16; G01S 3/28
(52) U.S. Cl. ........................ 342/383; 342/174; 342/368
(58) Field of Search ................................. 342/383, 174, 342/368, 371, 372, 374

(56) References Cited

U.S. PATENT DOCUMENTS 5,585,803 A * 12/1996 Miura et al. ................. 342/372

* cited by examiner

*Primary Examiner*—Theodore M. Blum
(74) *Attorney, Agent, or Firm*—Frommer Lawrence & Haug LLP; William S. Frommer (57) ABSTRACT

A receiver is provided which can avoid demodulation performance from deteriorating due to changes in circuit constants caused by changes over time and temperature-dependent changes, prevent an increase in the receiver size, and realize a cost reduction. A switch control section is provided to perform control such that an input terminal of one of a plurality of phase varying circuits is selectively connected through a first switch circuit to any of an output terminal of an RF amplifier and a local signal output terminal of a local signal generating circuit, whereby the one phase varying circuit serves as a calibration circuit in the calibration processing that is executed in the non-reception mode. Also, the output terminal of the one phase varying circuit is selectively connected through a second switch circuit or a third switch circuit to any of one input terminal of a signal combiner and a first input terminal of a multi-port junction circuit in a multi-port direct conversion demodulating section.

12 Claims, 8 Drawing Sheets

RECEIVER

BACKGROUND OF THE INVENTION

1. Field of the Invention

The present invention relates to a receiver, which includes a phased array antenna section and performs demodulation in accordance with the direct conversion method.

2. Description of the Related Art

In a conventional receiver including a phased array antenna, RF signals received by antenna elements are combined as they are, and demodulation is performed based on the combined signal.

Also, a conventional demodulator is, for example, of the direct conversion type using a mixer and a local signal.

Such a receiver including a phased array antenna, however, has a disadvantage in that since RF signals received by antenna elements are combined as they are, the amplitudes of the signals received by the antenna elements are uncertain and directivity control required in, e.g., the so-called beamformer, is difficult to perform.

Further, the demodulation method using a mixer has a difficulty in realizing a wider band and requires a high local level to be applied to the mixer. In addition, since the mixer is supplied with a high local power and is in a nonlinear operating state, a disadvantage occurs in that it is difficult to perform demodulation with a low distortion.

SUMMARY OF THE INVENTION

In view of the state of the art set forth above, it is an object of the present invention to provide a receiver, which can reliably recognize the amplitudes of signals received by antenna elements, can easily perform directivity control, and can realize demodulation over a wider band with a low distortion.

To achieve the above object, a receiver according to one aspect of the present invention comprises a phased array antenna section including a plurality of antenna elements each receiving a radio signal, a plurality of phase varying circuits for controlling phases of the respective signals received by the antenna elements to desired different phases, and a signal combiner for combining output signals of the plurality of phase varying circuits; a direct conversion demodulating section including a local signal generating circuit for generating a local signal of predetermined frequency, a generating unit for receiving a combined received signal, which is supplied from the signal combiner of the phased array antenna section, or a calibration signal and the local signal from the local signal generating circuit, for generating two signals having a phase difference therebetween based on at least one of the signals received by the generating unit, and for outputting at least one signal, at least one power detecting circuit for receiving the signal outputted from the generating unit and detecting a level of the signal received from the same, and a conversion circuit for, in a reception mode, converting the output signal of the power detecting circuit to a plurality of signal components, which are contained in the received signal or the local signal, based on set values of circuit parameters, and for, in a non-reception mode in which signals are not received, determining the values of the circuit parameters based on the output signal of the power detecting circuit and then correcting the circuit parameters to the determined values; and a switch circuit for, in the reception mode, applying the combined received signal outputted from the signal combiner of the phased array antenna section to the direct conversion demodulating section, and for, in the non-reception mode, applying the calibration signal to the direct conversion demodulating section instead of the combined received signal outputted from the signal combiner of the phased array antenna section.

Also, a receiver according to another aspect of the present invention comprises a phased array antenna section including a plurality of antenna elements for receiving a radio signal, a plurality of phase varying circuits for controlling phases of the respective signals received by the antenna elements to desired different phases, and a signal combiner for combining output signals of the plurality of phase varying circuits; a direct conversion demodulating section including a local signal generating circuit for generating a local signal of predetermined frequency, a generating unit for receiving a combined received signal, which is supplied from the signal combiner of the phased array antenna section, or a calibration signal and the local signal from the local signal generating circuit, for generating two signals having a phase difference therebetween based on at least one of the signals received by the generating unit, and for outputting at least one signal, at least one power detecting circuit for receiving the signal outputted from the generating unit and detecting a level of the signal received from the same, and a conversion circuit for, in a reception mode, converting the output signal of the power detecting circuit to a plurality of signal components, which are contained in the received signal or the local signal, based on set values of circuit parameters, and for, in a non-reception mode in which signals are not received, determining the values of the circuit parameters based on the output signal of the power detecting circuit and then correcting the circuit parameters to the determined values; and a switch control section for, in the non-reception mode, applying the local signal from the local signal generating circuit of the direct conversion demodulating section to one of the plurality of phase varying circuits of the phased array antenna section instead of the received signal from the antenna element corresponding to the one phase varying circuit, for setting a phase of the local signal, which is inputted to the one phase varying circuit, to a predetermined phase, and for applying the signal having been set to the predetermined phase, as the calibration signal, to the generating unit of the direct conversion demodulating section instead of the combined received signal outputted from the signal combiner of the phased array antenna section.

Preferably, the switch control section includes a control circuit for, at least in the non-reception mode, controlling the one phase varying circuit to set the phase of the local signal inputted thereto to be different from the phase of the local signal inputted to the generating unit.

Preferably, the switch control section comprises a first switch circuit having a first terminal connected to an output line of the antenna element corresponding to the one phase varying circuit, a second terminal connected to a local signal output terminal of the local signal generating circuit, and a third terminal connected to an input terminal of the one phase varying circuit, the first switch circuit selectively connecting the third terminal to the first terminal or the second terminal in response to a control signal; a second switch circuit having a first terminal connected to one input terminal of the signal combiner, a second terminal, and a third terminal connected to an output terminal of the one phase varying circuit, the second switch circuit selectively connecting the third terminal to the first terminal or the second terminal in response to the control signal; a third switch circuit having a first terminal connected to an output terminal of the signal combiner, a second terminal connected to the second terminal of the second switch circuit, and a third terminal connected to an input terminal of the generating unit, the third switch circuit selectively connecting the third terminal to the first terminal or the second terminal in response to the control signal; and a control circuit for, in the reception mode, controlling each of the first switch circuit, the second switch circuit and the third switch circuit by the control signal such that the third terminal is connected to the first terminal, and for, in the non-reception mode, controlling each of the first switch circuit, the second switch circuit and the third switch circuit by the control signal such that the third terminal is connected to the second terminal.

Preferably, at least in the non-reception mode, the control circuit controls the one phase varying circuit to set the phase of the local signal inputted thereto to be different from the phase of the local signal inputted to the generating unit.

Preferably, the local signal generating circuit sets a level of the local signal based on an output signal of the conversion circuit.

Preferably, the direct conversion demodulating section further includes a reproducing circuit for reproducing a carrier signal, which has the same frequency as that set by the local signal generating circuit, based on converted signals from the conversion circuit.

According to one aspect of the present invention, in the reception mode, the signals received by the antenna elements of the phased array antenna section pass the corresponding phase varying circuits, and are combined by the signal combiner.

At this time, the phase varying circuits of the phased array antenna section are controlled so as to change the phases of the received signals at values different from one another.

The combined received signal combined by and outputted from the signal combiner is applied to the first input terminal of the generating unit of the direct conversion demodulating section.

Also, the local signal of predetermined frequency generated from the local signal generating circuit is applied to the second input terminal of the generating unit.

The generating unit generates at least two signals having a phase difference between them based on the combined received signal and the local signal, and then supplies the combined received signal, the local signal and the generated signals to the power detecting circuit.

The power detecting circuit detects the signal level i.e., the amplitude component, of the input signal, and supplies a detected signal to the conversion circuit.

The conversion circuit demodulates the input detected signals to obtain signal components, i.e., an in-phase signal I and a quadrature signal Q, which are contained in the received signal, based on the values of circuit constants (parameters) including circuit parameters of the generating unit.

On the other hand, when executing the calibration to calculate the values of the circuit parameters, i.e., in the non-reception mode, the calibration signal is supplied to the first input terminal of the generating unit instead of the combined received signal.

In this case, the local signal generated by the local signal generating circuit is inputted to one of the phase varying circuits.

The local signal is also supplied to the second input terminal of the generating unit.

In the one phase varying circuit, the calibration signal having a phase different from that of the local signal, inputted to the generating unit, is generated in response to the control signal from the control circuit, and then supplied to the first input terminal of the generating unit through the second switch circuit and the third switch circuit.

The generating unit generates at least two signals having a phase difference between them based on the calibration signal and the local signal, and then supplies the calibration signal, the local signal and the generated signals to the power detecting circuit.

The power detecting circuit detects the signal level i.e., the amplitude component, of the input signal, and supplies a detected signal to the conversion circuit.

In the conversion circuit, the values of desired circuit parameters are calculated with predetermined simultaneous equations by comparing two signals having different phases with each other. The circuit parameters having been set so far are corrected in accordance with the calculated circuit parameters.

After that time, the conversion in the reception mode is executed using the corrected circuit parameters.

According to another aspect of the present invention, in the reception mode, the first switch circuit, the second switch circuit and the third switch circuit of the switch control section are each controlled by the control signal from the control circuit such that the third terminal is connected to the first terminal.

Upon the changeover of the switch circuits, the input terminal of the one phase varying circuit is connected to the output line of the corresponding antenna element, the output terminal of the one phase varying circuit is connected to one input terminal of the signal combiner, and the output terminal of the signal combiner is connected to the input terminal of the generating unit.

With that arrangement, in the reception mode, the signals received by the antenna elements of the phased array antenna section pass the corresponding phase varying circuits, and are combined by the signal combiner.

At this time, the phase varying circuits of the phased array antenna section are controlled so as to change the phases of the received signals at values different from one another.

The combined received signal combined by and outputted from the signal combiner is applied to the first input terminal of the generating unit of the direct conversion demodulating section.

Also, the local signal of predetermined frequency generated from the local signal generating circuit is applied to the second input terminal of the generating unit.

The generating unit generates at least two signals having a phase difference between them based on the combined received signal and the local signal, and then supplies the combined received signal, the local signal and the generated signals to the power detecting circuit.

The power detecting circuit detects the signal level i.e., the amplitude component, of the input signal, and supplies a detected signal to the conversion circuit.

The conversion circuit demodulates the input detected signals to obtain signal components, i.e., an in-phase signal I and a quadrature signal Q, which are contained in the received signal, based on the values of circuit constants (parameters) including circuit parameters of the generating unit.

On the other hand, when executing the calibration to calculate the values of the circuit parameters, i.e., in the non-reception mode, the first switch circuit, the second switch circuit and the third switch circuit of the switch control section are each controlled by the control signal from the control circuit such that the third terminal is connected to the second terminal.

Upon the changeover of the switch circuits, the local signal output terminal of the local signal generating circuit is connected to the input terminal of the one phase varying circuit, and the output terminal of the one phase varying circuit is connected to the input terminal of the generating unit.

An output signal of the one phase varying circuit is supplied to the first input terminal of the generating unit instead of the combined received signal.

In this case, the local signal generated by the local signal generating circuit is inputted to the one phase varying circuits.

The local signal is also supplied to the second input terminal of the generating unit.

In the one phase varying circuit, the calibration signal having a phase different from that of the local signal, inputted to the generating unit, is generated in response to the control signal from the control circuit, and then supplied to the first input terminal of the generating unit through the second switch circuit and the third switch circuit.

The generating unit generates at least two signals having a phase difference between them based on the calibration signal and the local signal, and then supplies the calibration signal, the local signal and the generated signals to the power detecting circuit.

The power detecting circuit detects the signal level i.e., the amplitude component, of the input signal, and supplies a detected signal to the conversion circuit.

In the conversion circuit, the values of desired circuit parameters are calculated with predetermined simultaneous equations by comparing two signals having different phases with each other. The circuit parameters having been set so far are corrected in accordance with the calculated circuit parameters.

After that time, the conversion in the reception mode is executed using the corrected circuit parameters.

With the features set forth above, the present invention can provide the following advantages. Directivity of a phased array antenna can be controlled as desired, and the amplitudes of the signals received by the antenna elements can be can be always confirmed without becoming uncertain.

Also, since the receiver uses a multi-port demodulator including the power detecting circuit, it can easily realize demodulation over a wider band and has good adaptability for software radio communications that require multiband or wideband characteristics. While recent radio communications have a tendency to employ higher frequency as the carrier frequency, the receiver is also adaptable for such a demand for the use of higher frequency.

Further, since the power detecting circuit operates in a linear range in the multi-port demodulation, a low-power local signal can be used to perform demodulation with a low distortion.

In addition, according to the present invention, it is possible to prevent an increase in the receiver size and to realize a cost reduction.

Moreover, since the receiver includes the phase varying circuit which also functions as a calibration circuit, frequency changes, temperature-dependent changes, and changes over time of internal parameters of a multi-port direct conversion circuit can be compensated for through self-calibration.

DESCRIPTION OF THE PREFERRED EMBODIMENTS

First Embodiment

Figure 1:
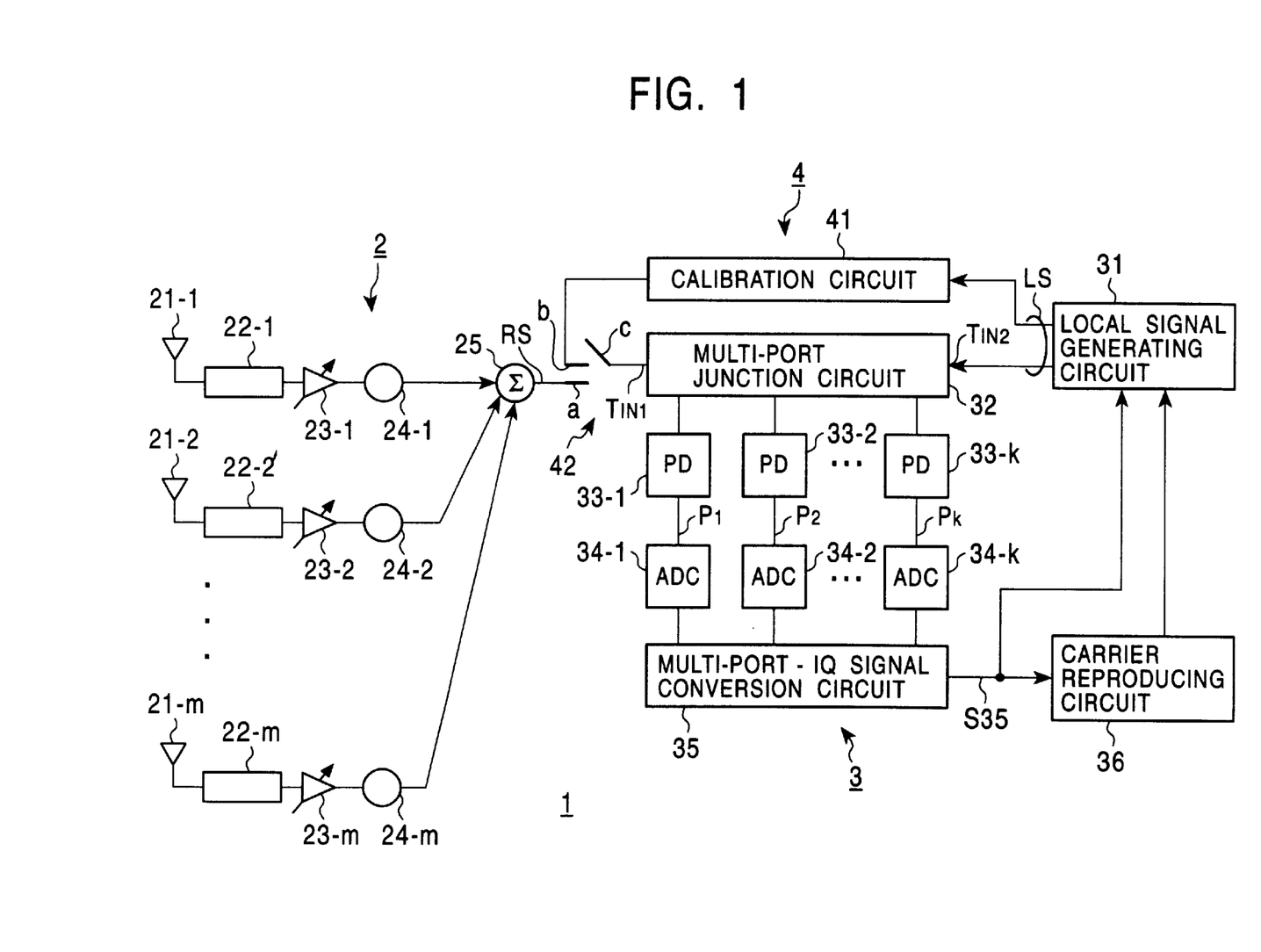
FIG. 1 is a block diagram showing a first embodiment of a receiver according to the present invention, which includes a phased array antenna section and performs demodulation in accordance with the direct conversion method.

FIG. 1 is a block diagram showing a first embodiment of a receiver according to the present invention, which includes a phased array antenna section and performs demodulation in accordance with the direct conversion method.

A receiver 1 of this embodiment comprises a phased array antenna section 2, a multi-port direct conversion demodulating section 3, and a calibration functioning section 4.

The multi-port direct conversion method is a receiving method reported in, e.g., References [1], [2], [3] and [4] given as below. Herein, the term "multi-port direct conversion method" is a generic term for demodulation methods using power detecting circuits (power detectors).

Reference [1]: Ji Li, R. G. Bosisio, "A Six-port Direct Digital Millimeter Wave Receiver", MTT-S, 1994, Reference [2]: Hans-Otto Scheck, et al., "A method for implementing a direct conversion receiver with a six-port junction", EP 0 805 561 A2, Reference [3]: V. Brankovic, EP 0 896 455 A1, and Reference [4]: V. Brankovic, et al., WO 99/33166.

The phased array antenna section 2 comprises m pieces (m is an integer equal to or more than 2) of antenna elements 21-1 to 21-$m$, m pieces of preselect filters 22-1 to 22-$m$, m pieces of RF amplifiers 23-1 to 23-$m$, m pieces of phase varying circuits 24-1 to 24-$m$, and a signal combiner 25.

In the phased array antenna section 2, basically (i.e., in the reception mode), the preselect filters 22-1 to 22-$m$, the RF amplifiers 23-1 to 23-$m$, and the phase varying circuits 24-1 to 24-$m$ are cascaded to the antenna elements 21-1 to 21-$m$, respectively. Then, output signals of the phase varying circuits 24-1 to 24-$m$ are directly supplied to m pieces of input terminals of the signal combiner 25.

The m pieces of phase varying circuits 24-1 to 24-$m$ are constructed so as to change the phases of received signals at values different from one another in the reception mode.

For example, PIN diodes and FETs are employed to constitute the phase varying circuits 24-1 to 24-$m$ (see, e.g., Reference [5]: S. K Koul, et al., Microwave and Millimeter Wave Phase Shifters; Volume II Semiconductor and Delay Line Phase Shifters, Artech House, 1991).

The multi-port direct conversion demodulating section 3 comprises a local signal generating circuit 31, a multi-port (n-port) junction circuit 32, at least one power detecting circuit (PD) 33-1 to 33-$k$ (k=n−2), at least one analog/digital (A/D) conversion circuit (ADC) 34-1 to 34-$k$, a multi-port IQ signal conversion circuit 35, and a carrier reproducing circuit 36.

The local signal generating circuit 31 generates a local signal LS of predetermined frequency and supplies the local signal LS to the multi-port junction circuit 32 and a calibration circuit 41.

When generating the local signal LS, the local signal generating circuit 31 adjusts the signal level in accordance with an output signal S35 of the multi-port IQ signal conversion circuit 35, and adjusts the signal frequency upon receiving a reproduction signal S36 from the carrier reproducing circuit 36.

The multi-port junction circuit 32 has a first input terminal $T_{IN1}$ to which a combined received signal RS or a calibration signal CS is supplied, and a second input terminal $T_{IN2}$ to which the local signal LS is supplied. The multi-port junction circuit 32 receives the combined received signal RS or the calibration signal CS and the local signal LS, and generates, based on at least one of the signals received by it, two signals (high-frequency signals) having a phase difference between them. Then, the multi-port junction circuit 32 outputs the combined received signal RS or the calibration signal CS, the local signal LS and at least one of the generated two signals to the power detecting circuit(s) 33-1 to 33-$k$.

Thus, the multi-port junction circuit 32 has two input terminals and at least one output terminal. In other words, the multi-port junction circuit 32 is constituted as a circuit having n (multiple) ports corresponding to the total of the two input terminals and the number of output terminals.

The power detecting circuits 33-1 to 33-$k$ detect the amplitude components of respective output signals of the multi-port junction circuit 32 and then output detected signals $P_1$ to $P_k$ to the A/D conversion circuits 34-1 to 34-$k$.

The A/D conversion circuits 34-1 to 34-$k$ convert the detected signals $P_1$ to $P_k$, which are outputted from the power detecting circuits 33-1 to 33-$k$, from the analog to digital form, and then supply resulting digital signals to the multi-port IQ signal conversion circuit 35.

The calibration functioning section 4 comprises a calibration circuit 41 and a SPDT (Single-Pole Double-Throw) RF switch circuit 42 (referred to simply as a "switch circuit" hereinafter).

The switch circuit 42 has a first terminal a connected to an output terminal of the signal combiner 25, a second terminal b connected to an output terminal of the calibration circuit 41, and a third terminal c connected to a first input terminal of the multi-port junction circuit 32. The switch circuit 42 is changed over by a control circuit (not shown) such that the third terminal c is connected to the first terminal a in the reception mode for receiving signals, and the third terminal c is connected to the second terminal b in the non-reception mode in which signals are not received.

Figure 2:
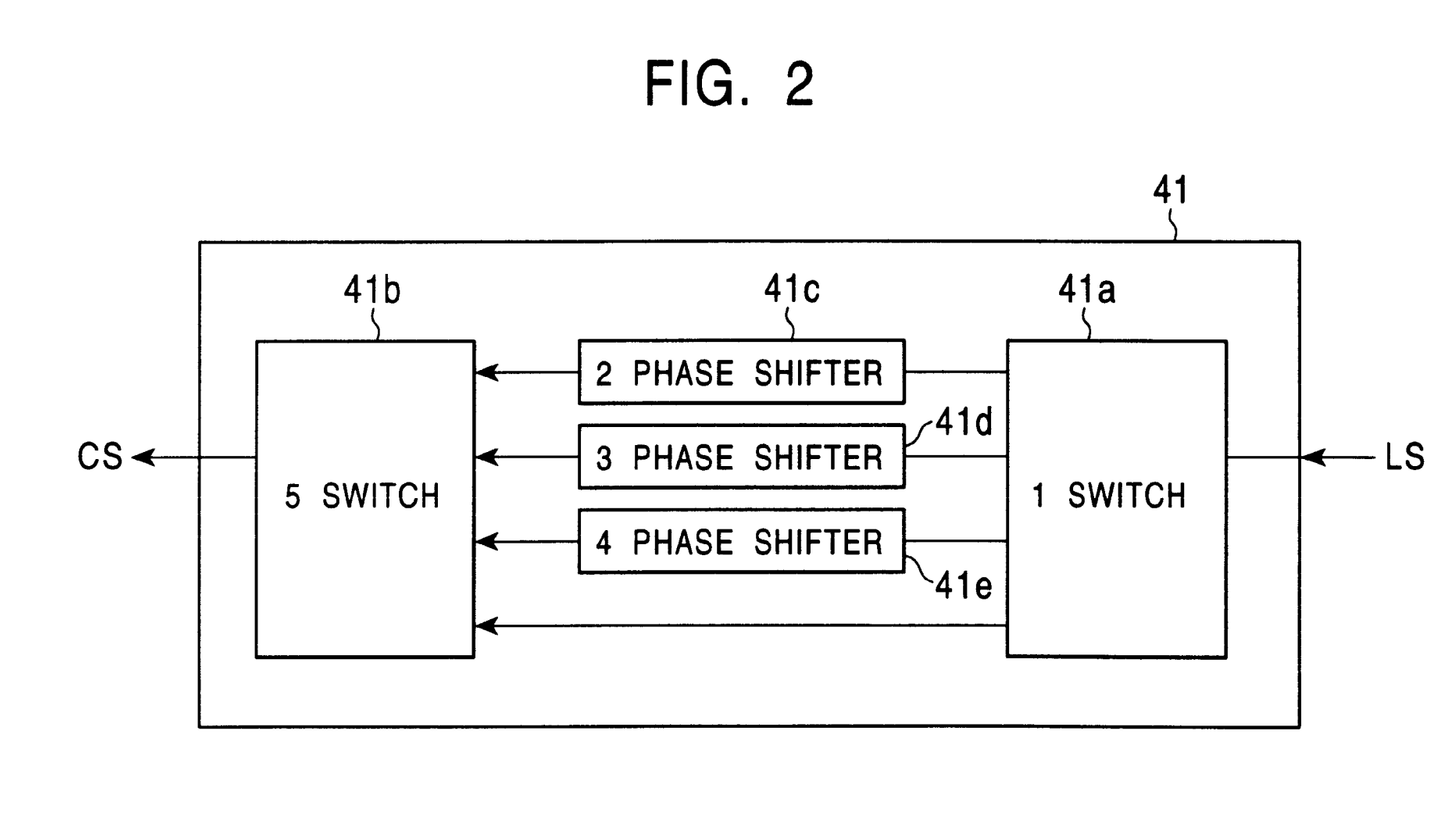
FIG. 2 is a block diagram showing one example of configuration of a calibration circuit.

FIG. 2 is a block diagram showing one example of configuration of the calibration circuit 41.

The calibration circuit 41 comprises two switches 41$a$, 41$b$ and three phase shifters 41$c$, 41$d$ and 41$e$.

The three phase shifters 41$c$, 41$d$ and 41$e$ are connected between outputs of the switch 41$a$ and inputs of the switch 41$b$. Further, one output of the switch 41$a$ is directly connected to one input of the switch 41$b$ without a phase shifter interposed therebetween.

The operation of the receiver thus constructed will be described below.

In the above-described construction, when the receiver is in the reception mode, signals received by the antenna elements 21-1 to 21-$m$ of the phased array antenna section 2 pass respectively the preselect filters 22-1 to 22-$m$, the RF amplifiers 23-1 to 23-$m$ and the phase varying circuits 24-1 to 24-$m$, which are cascaded to the antenna elements 21-1 to 21-$m$. The received signals are then combined by the signal combiner 25.

The phase varying circuits 24-1 to 24-$m$ of the phased array antenna section 2 are controlled by a phase control circuit (not shown) so as to change the phases of the received signals at values different from one another.

The combined received signal RS combined by and outputted from the signal combiner 25 is inputted to the first terminal a of the switch circuit 42. In the reception mode, as described above, the switch circuit 42 is controlled to change over such that the third terminal c is connected to the first terminal a.

Accordingly, the combined received signal RS from the signal combiner 25 is inputted to the first input terminal $T_{IN1}$ of the multi-port junction circuit 32 in the multi-port direct conversion demodulating section 3.

Also, the local signal LS of predetermined frequency generated by the local signal generating circuit 31 is inputted to the second input terminal $T_{IN2}$ of the multi-port junction circuit 32.

In the multi-port junction circuit 32, at least two signals having a phase difference between them are generated based on the combined received signal RS and the local signal LS. Then, the combined received signal RS, the local signal LS, and the generated signals are supplied to the power detecting circuits 33-1 to 33-$k$.

In the power detecting circuits 33-1 to 33-$k$, the signal levels, i.e., the amplitude components, of the input signals are detected, and resulting detected signals $P_1$ to $P_k$ are converted by the A/D conversion circuits 34-1 to 34-$k$ from the analog to digital form and then supplied to the multi-port IQ signal conversion circuit 35.

The multi-port IQ signal conversion circuit 35 demodulates the input detected signals to obtain signal components, i.e., an in-phase signal I and a quadrature signal Q, which are contained in the received signal, based on the values of circuit constants (parameters) including circuit parameters of the multi-port junction circuit 32. The resulting demodulated signals are then supplied to the carrier reproducing circuit 36.

In the carrier reproducing circuit 36, a carrier signal having the same frequency as that set by the local signal generating circuit 31 is reproduced.

While the in-phase signal I and the quadrature signal Q contained in the received signal are obtained in the multi-port direct conversion demodulating section 3 by using the known circuit constants, it is required to precisely know the values of circuit constants for realizing higher compatible performance. Therefore, calibration is often performed by applying a known input signal.

One example of calibration for the multi-port direct conversion will be described below. Since the following example is explained in detail in Reference [6] (G. Oberschmidt, et al., "Calibration of a N-port Receiver Calibration", European patent application No. 99 113 262.2, filed on Jul. 8, 1999), a brief description is given below.

When calculating the values of circuit parameters of the multi-port junction circuit 32, i.e., in the non-reception mode, the switch circuit 42 is controlled to change over such that the third terminal c is connected to the second terminal b. Upon the changeover of the switch circuit 42, an output signal of the calibration circuit 41 is supplied to the first input terminal $T_{IN1}$ of the multi-port junction circuit 32 instead of the combined received signal RS.

The local signal LS generated by the local signal generating circuit 31 is inputted to the calibration circuit 41.

The local signal LS is also supplied to the second input terminal $T_{IN2}$ of the multi-port junction circuit 32.

In the calibration circuit 41, the calibration signal CS having a phase different from that of the local signal LS, inputted to the multi-port junction circuit 32, is generated by properly selecting the switches 41a and 41b, and then supplied to the first input terminal $T_{IN1}$ of the multi-port junction circuit 32 through the switch circuit 42.

In the multi-port junction circuit 32, at least two signals having a phase difference between them are generated based on the calibration signal CS and the local signal LS. Then, the calibration signal CS, the local signal LS, and the generated signals are supplied to the power detecting circuits 33-1 to 33-k.

In the power detecting circuits 33-1 to 33-k, the signal levels, i.e., the amplitude components, of the input signals are detected, and resulting detected signals $P_1$ to $P_k$ are converted by the A/D conversion circuits 34-1 to 34-k from the analog to digital form and then supplied to the multi-port IQ signal conversion circuit 35.

In the multi-port IQ signal conversion circuit 35, the values of circuit parameters $h_{ik}$, $h_{qk}$ of the multi-port junction circuit 32 are calculated with predetermined simultaneous equations by comparing two signals having different phases with each other.

With the first embodiment, as described above, the receiver comprises the phased array antenna section 2 including the preselect filters 22-1 to 22-m, the RF amplifiers 23-1 to 23-m and the phase varying circuits 24-1 to 24-m cascaded to the antenna elements 21-1 to 21-m, output signals of the phase varying circuits 24-1 to 24-m being directly supplied to m pieces of input terminals of the signal combiner 25; and the multi-port direct conversion demodulating section 3 comprising the multi-port junction circuit 32 for generating at least two signals having a phase difference therebetween based on the combined received signal RS and the local signal LS, and then outputting the combined received signal RS, the local signal LS and the generated signals, the power detecting circuits 33-1 to 33-k for detecting the levels, i.e., the amplitude components, of the output signals of the multi-port junction circuit 32, and the multi-port IQ signal conversion circuit 35 for receiving the digital detected signals $P_1$ to $P_k$ inputted thereto and demodulating signal components, i.e., the in-phase signal I and the quadrature signal Q, which are contained in the received signal, based on the values of circuit constants (parameters) including circuit parameters of the multi-port junction circuit 32. Therefore, advantages are obtained in that directivity of a phased array antenna can be controlled as desired, and the amplitudes of the signals received by the antenna elements can be can be always confirmed without becoming uncertain.

Also, since the receiver uses a multi-port demodulator including the power detecting circuit, it can easily realize demodulation over a wider band and has good adaptability for software radio communications that require multiband or wideband characteristics. While recent radio communications have a tendency to employ higher frequency as the carrier frequency, the receiver is also adaptable for such a demand for the use of higher frequency.

Further, since the power detecting circuit operates in a linear range in the multi-port demodulation, a low-power local signal can be used to perform demodulation with a low distortion.

Second Embodiment

Figure 3:
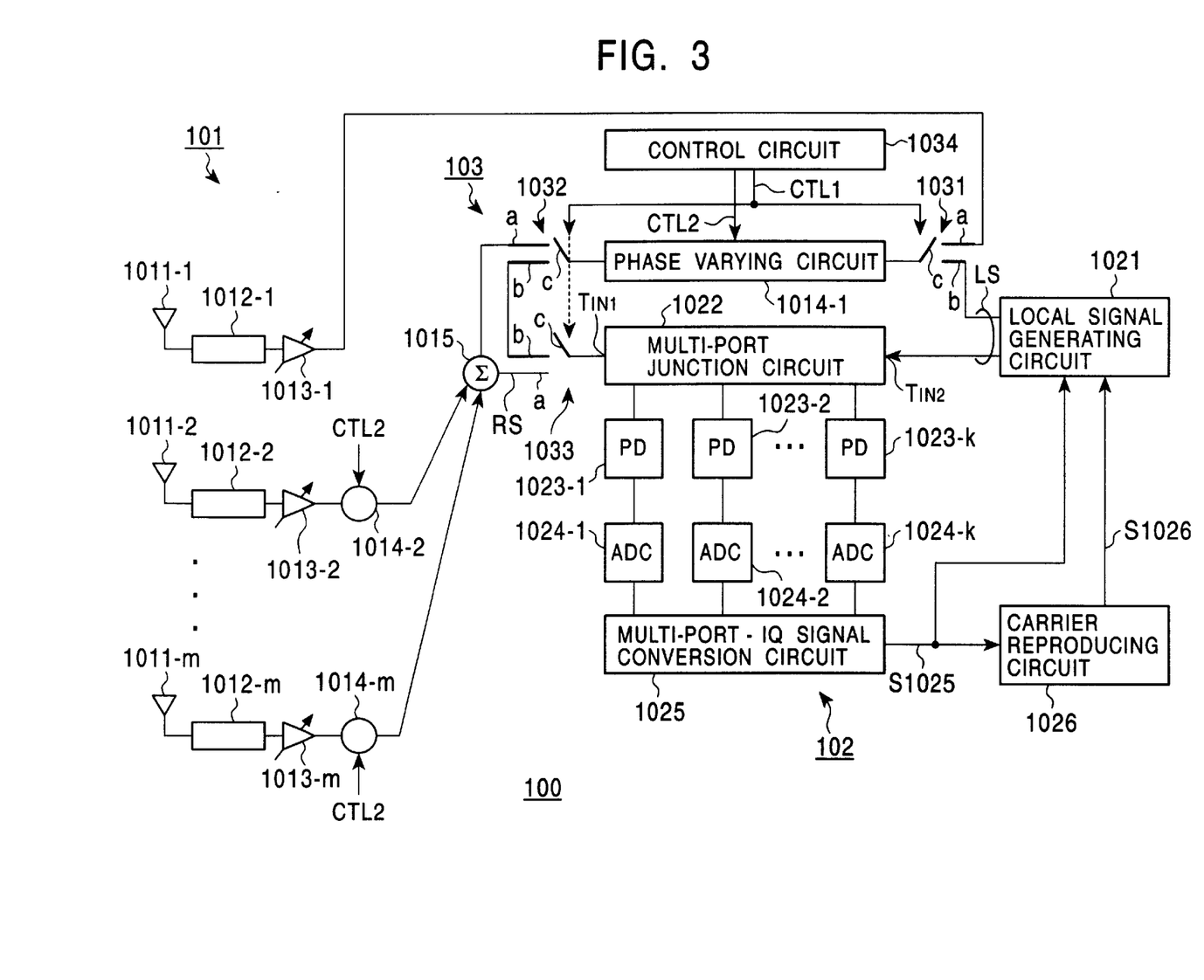
FIG. 3 is a block diagram showing a second embodiment of the receiver according to the present invention, which includes a phased array antenna section and performs demodulation in accordance with the direct conversion method.

FIG. 3 is a block diagram showing a second embodiment of the receiver according to the present invention, which includes a phased array antenna section and performs demodulation in accordance with the direct conversion method.

A receiver 100 of this embodiment mainly comprises a phased array antenna section 101, a multi-port direct conversion demodulating section 102, and a switch control section 103.

The phased array antenna section 101 comprises m pieces (m is an integer equal to or more than 2) of antenna elements 1011-1 to 1011-m, m pieces of preselect filters 1012-1 to 1012-m, m pieces of RF amplifiers 1013-1 to 1013-m, m pieces of phase varying circuits 1014-1 to 1014-m, and a signal combiner 1015.

In the phased array antenna section 101, basically (i.e., in the reception mode), the preselect filters 1012-1 to 1012-m, the RF amplifiers 1013-1 to 1013-m, and the phase varying circuits 1014-1 to 1014-m are cascaded to the antenna elements 1011-1 to 1011-m, respectively. Then, output signals of the phase varying circuits 1014-1 to 1014-m are supplied to m pieces of input terminals of the signal combiner 1015 through a switch circuit or directly.

The m pieces of phase varying circuits 1014-1 to 1014-m are controlled by a control circuit 1034 (described later) so as to change the phases of received signals at values different from one another in the reception mode.

In this embodiment, one 1014-1 of the m pieces of phase varying circuits 1014-1 to 1014-m, which is connected to the line cascaded to the antenna element 1011-1, is controlled to serve as a calibration circuit in the calibration processing that is executed in the non-reception mode.

More specifically, the phase varying circuit 1014-1 has an input terminal which is controlled by a first switch circuit 1031 (described later) of the switch control section 103 to be selectively connected to any of an output terminal of the RF amplifier 1013-1 and an output terminal for a local signal LS generated by a local signal generating circuit 1021 (described later) of the multi-port direct conversion demodulating section 102, and has an output terminal which is controlled by a second switch circuit 1032 (described later) of the switch control section 103, in combination with a third switch circuit 1033 thereof, to be selectively connected to any of one input terminal of the signal combiner 1015 and a first input terminal of a multi-port junction circuit 1022 (described later) of the multi-port direct conversion demodulating section 102.

Further, in the non-reception mode, the phase varying circuit 1014-1 is controlled by the control circuit 1034 (described later in detail) such that the phase of the local signal LS inputted to the phase varying circuit 1014-1 is different from the phase of the local signal LS supplied to the multi-port junction circuit 1022. Thus, in the non-reception mode, the phase varying circuit 1014-1 outputs a calibration signal CS having a phase different from that of the local signal LS supplied to the multi-port junction circuit 1022.

For example, PIN diodes and FETs are employed to constitute the phase varying circuits 1014-1 to 1014-*m* (see Reference [5]).

Figure 4:
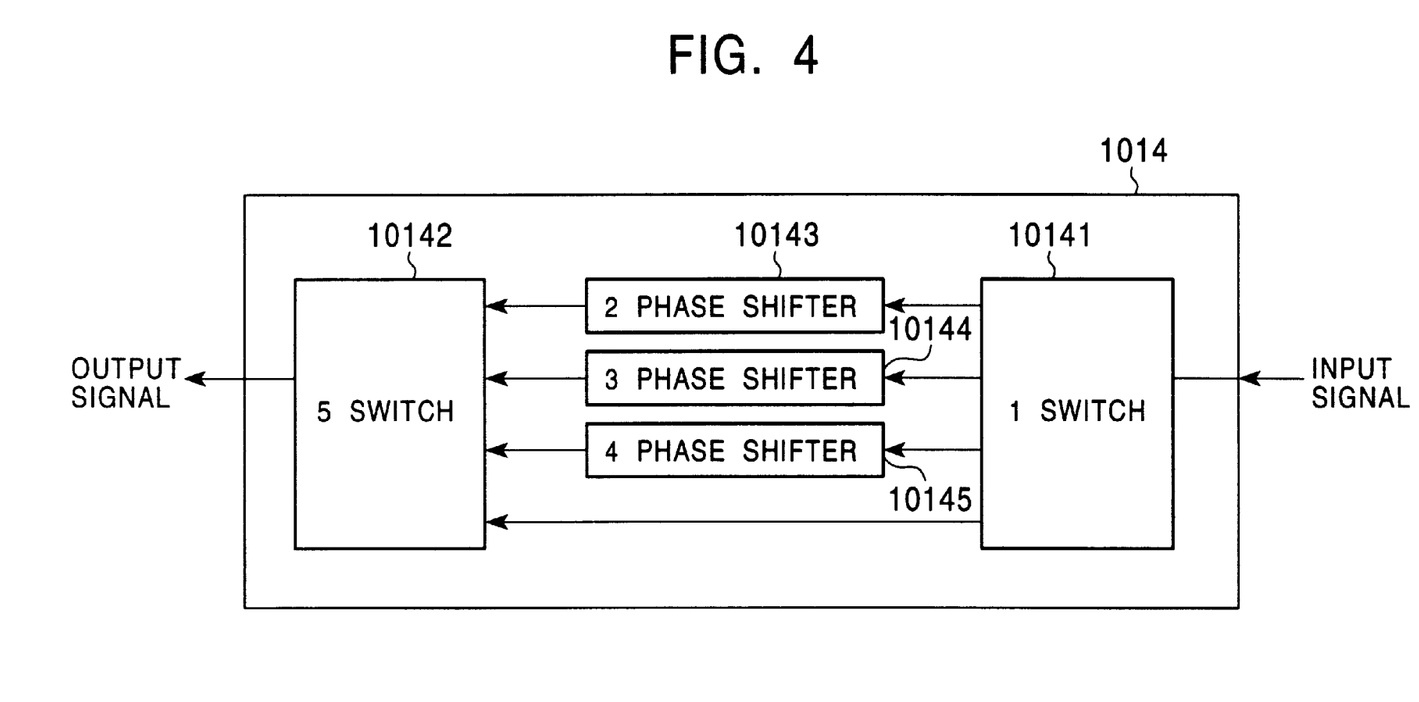
FIG. 4 is a block diagram showing one example of configuration of a phase varying circuit in FIG. 3.

FIG. 4 is a block diagram showing one example of configuration of the phase varying circuit 1014(-1 to -*m*) shown in FIG. 3.

The phase varying circuit 1014 comprises, as shown in FIG. 4, two switches 10141, 10142 and three phase shifters 10143, 10144 and 10145.

The three phase shifters 10143, 10144 and 10145 are connected between outputs of the switch 10141 and inputs of the switch 10142. Further, one output of the switch 10141 is directly connected to one input of the switch 10142 without a phase shifter interposed therebetween.

Then, the two switches 10141, 10142 are properly controlled by the control circuit 1034 so as to change over such that the phase of an input signal is changed in four stages.

In the phased array antenna section 101, when the receiver is in the reception mode, signals received by the antenna elements 1011-1 to 1011-*m* pass respectively the preselect filters 1012-1 to 1012-*m*, the RF amplifiers 1013-1 to 1013-*m* and the phase varying circuits 1014-1 to 1014-*m*, which are cascaded to the antenna elements 1011-1 to 1011-*m*. The received signals are then combined by the signal combiner 1015.

The multi-port direct conversion demodulating section 102 comprises a local signal generating circuit 1021, a multi-port (n-port; n is an integer equal to or more than 3) junction circuit 1022, at least one power detecting circuit (PD) 1023-1 to 1023-*k* (k=n−2), at least one analog/digital (A/D) conversion circuit (ADC) 1024-1 to 1024-*k*, a multi-port IQ signal conversion circuit 1025, and a carrier reproducing circuit 1026.

The local signal generating circuit 1021 generates a local signal LS of predetermined frequency and supplies the local signal LS to the multi-port junction circuit 1022 and the switch control section 103.

When generating the local signal LS, the local signal generating circuit 1021 adjusts the signal level in accordance with an output signal S1025 of the multi-port IQ signal conversion circuit 1025, and adjusts the signal frequency upon receiving a reproduction signal S1026 from the carrier reproducing circuit 1026.

The multi-port junction circuit 1022 has a first input terminal $T_{IN1}$ to which a combined received signal RS or a calibration signal CS is supplied, and a second input terminal $T_{IN2}$ to which the local signal LS is supplied. The multi-port junction circuit 1022 receives the combined received signal RS or the calibration signal CS and the local signal LS, and generates, based on at least one of the signals received by it, two signals (high-frequency signals) having a phase difference between them. Then, the multi-port junction circuit 1022 outputs the combined received signal RS or the calibration signal CS, the local signal LS and at least one of the generated two signals to the power detecting circuit(s) 1023-1 to 1023-*k*.

Thus, the multi-port junction circuit 1022 has two input terminals and at least one output terminal. In other words, the multi-port junction circuit 1022 is constituted as a circuit having n (multiple) ports corresponding to the total of the two input terminals and the number of output terminals.

The power detecting circuits 1023-1 to 1023-*k* detect the amplitude components of respective output signals of the multi-port junction circuit 1022 and then output detected signals $P_1$ to $P_k$ to the A/D conversion circuits 1024-1 to 1024-*k*.

The A/D conversion circuits 1024-1 to 1024-*k* convert the detected signals $P_1$ to $P_k$, which are outputted from the power detecting circuits 1023-1 to 1023-*k*, from the analog to digital form, and then supply resulting digital signals to the multi-port IQ signal conversion circuit 1025.

Examples of a practical construction of the n (3 to 6)-port junction circuit 1022 will be described below with reference to the drawings.

Figure 5:
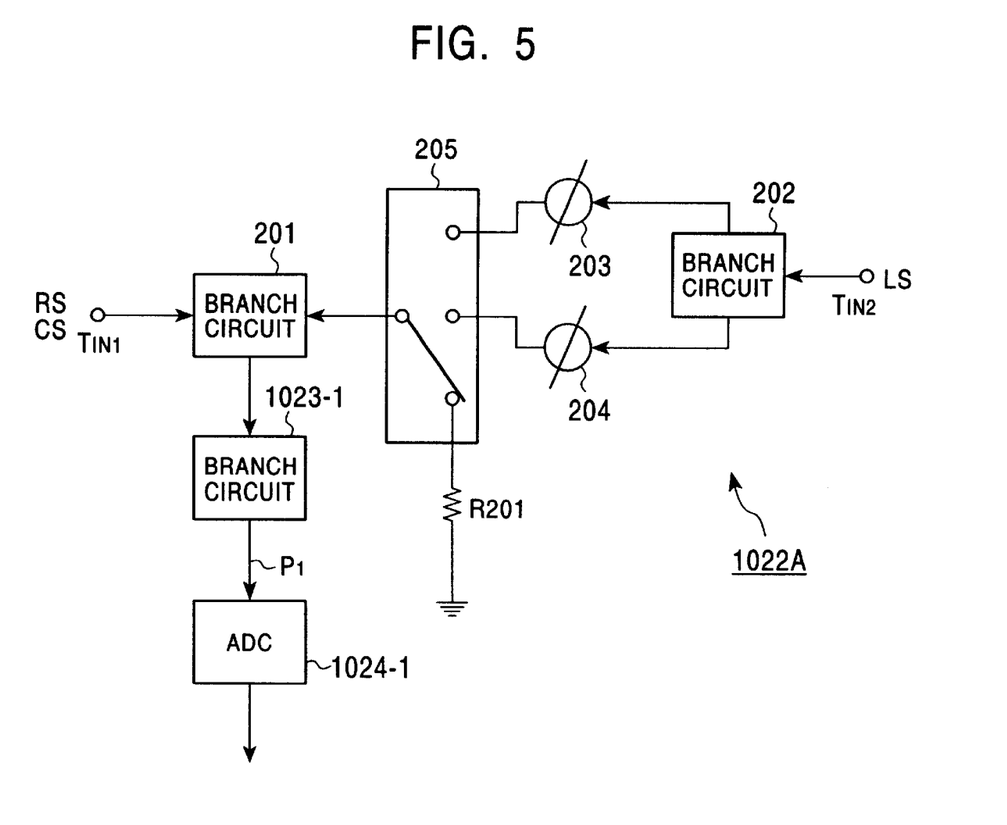
FIG. 5 is a circuit diagram showing one example of configuration of a 3-port junction circuit according to the present invention.

FIG. 5 is a circuit diagram showing one example of configuration of a 3-port junction circuit.

A 3-port junction circuit 1022A of FIG. 5 has a first input terminal $T_{IN1}$ for a received signal or a calibration signal, and a second input terminal $T_{IN2}$ for a local signal. Also, the 3-port junction circuit 1022A comprises branch circuits 201, 202, phase shifters 203, 204, and a switching circuit 205. In this case, one power detecting circuit 1023-1 is connected to an output stage of the 3-port junction circuit 1022A.

Thus, the 3-port junction circuit 1022A has three ports, i.e., two ports serving as the first input terminal $T_{IN1}$ and the second input terminal $T_{IN2}$, as well as one port serving as an output terminal of the branch circuit 201 connected to the power detecting circuit 1023-1.

Note that, in the 3-port junction circuit 1022A of FIG. 5, the branch circuits 201, 202, the phase shifters 203, 204, and the switching circuit 205 constitute generating means.

In the 3-port junction circuit 1022A, the combined received signal RS or the calibration signal CS inputted to the first input terminal $T_{IN1}$ is applied to the branch circuit 201 and branched into two signals. One of the branched signals is inputted to the power detecting circuit 1023-1.

Also, the local signal LS inputted to the second input terminal $T_{IN2}$ is applied to the branch circuit 202 and branched into two signals. One of the branched signals is inputted to the phase shifter 203, from which it is applied to the switching circuit 205 after being given with a phase shift θ. The other branched signal from the branch circuit 202 is inputted to the phase shifter 204, from which it is applied to the switching circuit 205 after being given with a phase shift θ. The signals having the phases shifted by the phase shifters 203 and 204 are successively selected by the switching circuit 205 and supplied to the branch circuit 201.

The signal thus applied to the branch circuit 201 is branched into a signal inputted to the power detecting circuit 1023-1 and a signal supplied to the first input terminal $T_{IN1}$.

The power detecting circuit 1023-1 detects the amplitude components of the signals inputted to it. Then, the detected signals are converted by the A/D conversion circuit 1024-1 from the analog to digital form, and are supplied to the multi-port IQ signal conversion circuit 1025. In the conversion circuit 1025, the input signals are converted to and outputted as demodulated signals, i.e., an in-phase signal I and a quadrature signal Q.

Figure 6:
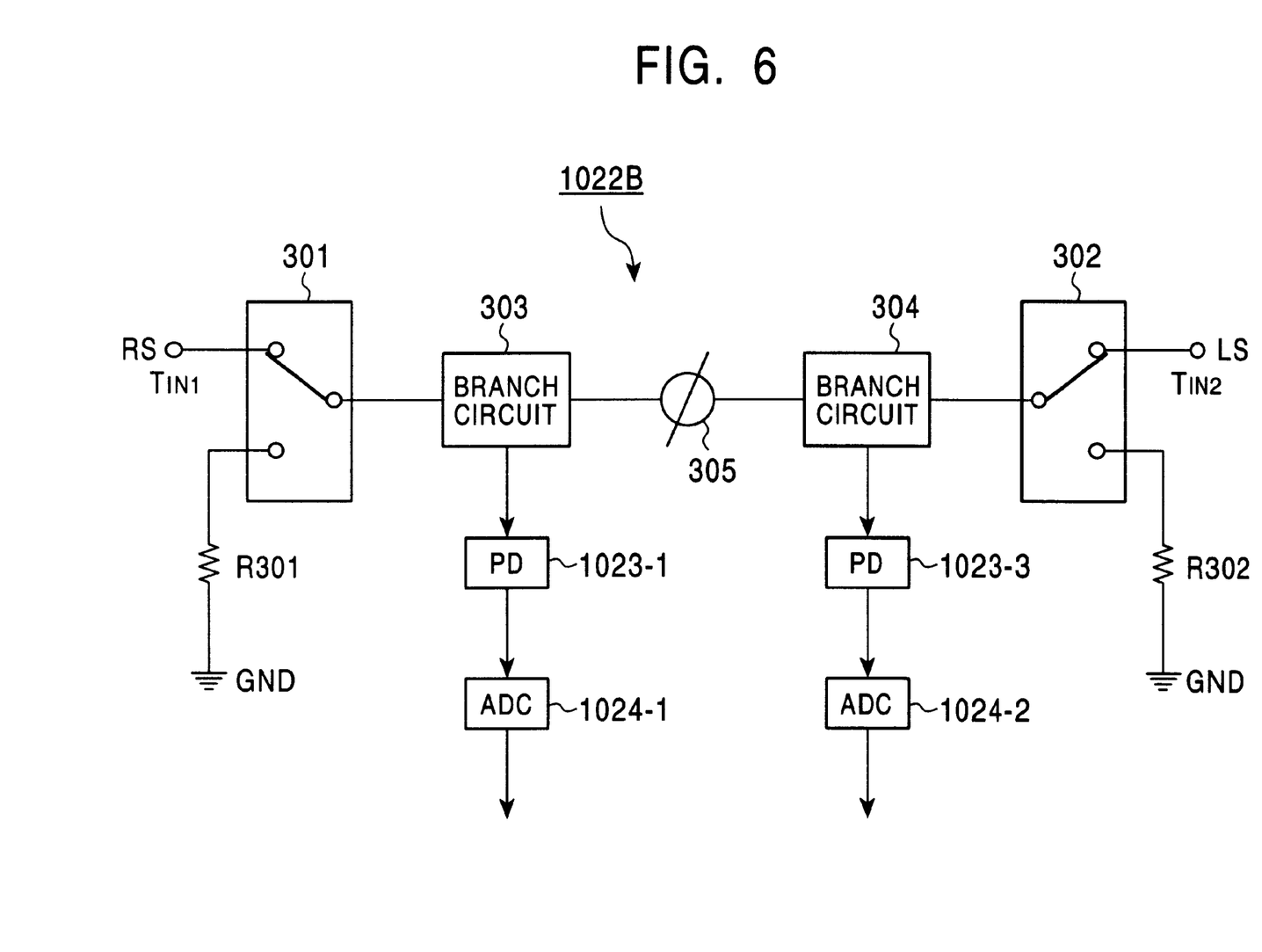
FIG. 6 is a circuit diagram showing one example of configuration of a 4-port junction circuit according to the present invention.

FIG. 6 is a circuit diagram showing one example of configuration of a 4-port junction circuit.

A 4-port junction circuit 1022B of FIG. 6 has a first input terminal $T_{IN1}$ for a received signal or a calibration signal, and a second input terminal $T_{IN2}$ for a local signal. Also, the 4-port junction circuit 1022B comprises switching circuits 301, 302, branch circuits 303, 304, and a phase shifter 305. In this case, two power detecting circuits 1023-1, 1023-2 are connected to an output stage of the 4-port junction circuit 1022B.

Thus, the 4-port junction circuit 1022B has four ports, i.e., two ports serving as the first input terminal $T_{IN1}$ and the second input terminal $T_{IN2}$, as well as two ports serving as an output terminal of the branch circuit 303 connected to the power detecting circuit 1023-1 and an output terminal of the branch circuit 304 connected to the power detecting circuit 1023-2.

Note that, in the 4-port junction circuit 1022B of FIG. 6, the switching circuits 301, 302, the branch circuits 303, 304, and the phase shifter 305 constitute generating means.

In the 4-port junction circuit 1022B, the combined received signal RS or the calibration signal CS inputted to the first input terminal $T_{IN1}$ is applied to the branch circuit 303 through the high-speed switching circuit 301 and branched into two signals. One of the branched signals is inputted to the power detecting circuit 1023-1, and the other branched signal is inputted to the phase shifter 305.

The phase shifter 305 gives a phase shift θ to the input signal from the branch circuit 303. The signal having the shifted phase is inputted to the branch circuit 304 and branched into two signals. One of the branched signals from the branch circuit 304 is inputted to the power detecting circuit 1023-2, and the other branched signal is supplied to the high-speed switching circuit 302.

Also, the local signal LS inputted to the second input terminal $T_{IN2}$ is applied to the branch circuit 304 through the high-speed switching circuit 302 and branched into two signals. One of the branched signals is inputted to the power detecting circuit 1023-2, and the other branched signal is inputted to the phase shifter 305.

The phase shifter 305 gives a phase shift θ to the local signal from the branch circuit 304. The signal having the shifted phase is inputted to the branch circuit 303 and branched into two signals. One of the branched signals from the branch circuit 303 is inputted to the power detecting circuit 1023-1, and the other branched signal is supplied to the high-speed switching circuit 301.

With the above arrangement, the received signal and the local signal given with the phase shift θ are supplied to the power detecting circuit 1023-1. The power detecting circuit 1023-1 detects the amplitude components of the signals supplied to it. The detected signals are converted by the A/D conversion circuit 1024-1 from the analog to digital form, and are supplied to the multi-port IQ signal conversion circuit 1025.

Also, the local signal and the received signal given with the phase shift θ are supplied to the power detecting circuit 1023-2. The power detecting circuit 1023-2 detects the amplitude components of the signals supplied to it. The detected signals are converted by the A/D conversion circuit 1024-2 from the analog to digital form, and are supplied to the multi-port IQ signal conversion circuit 1025.

In the conversion circuit 1025, the input signals are converted to and outputted as demodulated signals, i.e., an in-phase signal I and a quadrature signal Q.

Figure 7:
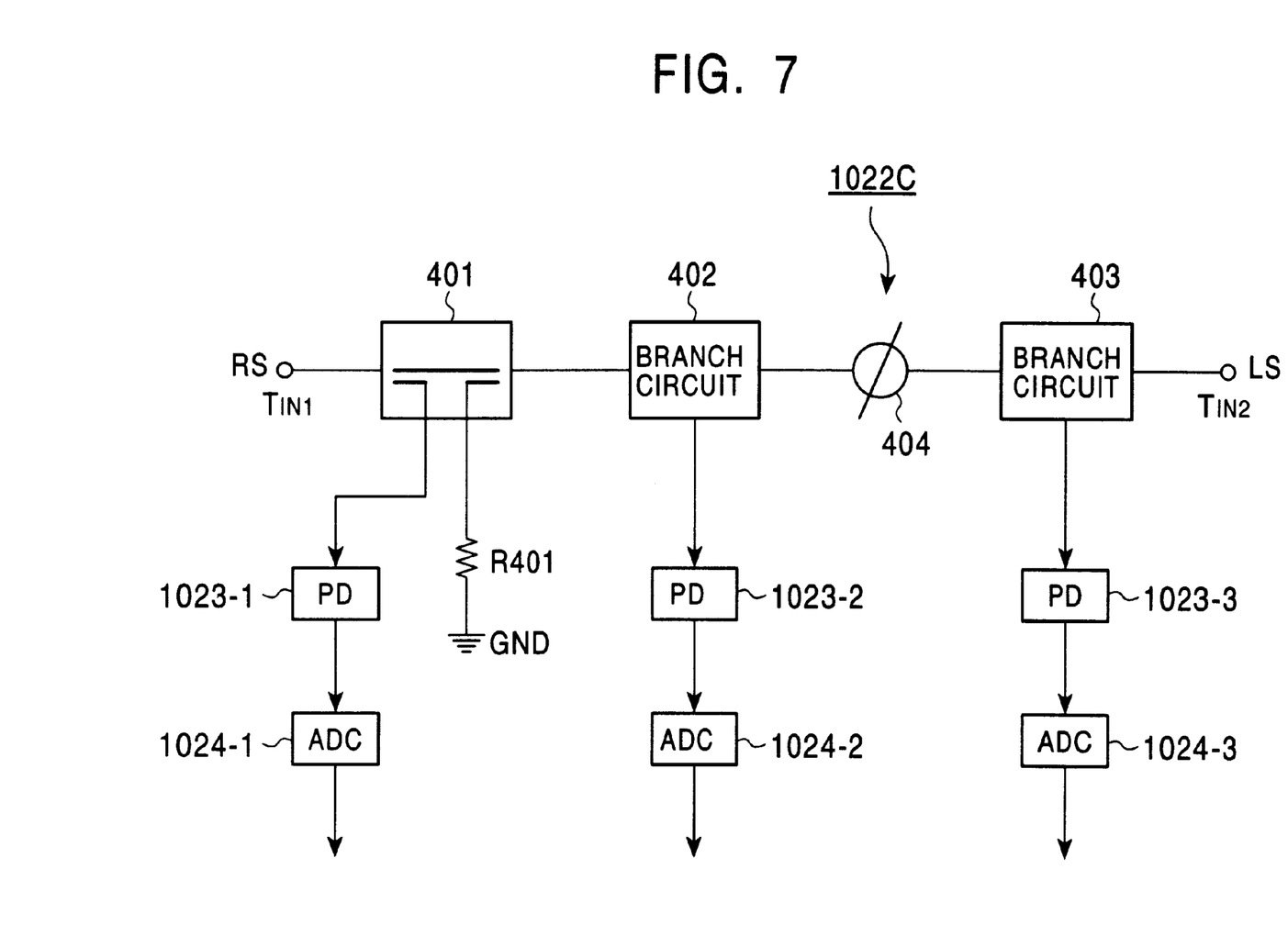
FIG. 7 is a circuit diagram showing one example of configuration of a 5-port junction circuit according to the present invention.

FIG. 7 is a circuit diagram showing one example of configuration of a 5-port junction circuit.

A 5-port junction circuit 1022C of FIG. 7 has a first input terminal $T_{IN1}$ for a received signal or a calibration signal, and a second input terminal $T_{IN2}$ for a local signal. Also, the 5-port junction circuit 1022C comprises a coupler 401, branch circuits 402, 403, and a phase shifter 404. In this case, three power detecting circuit 1023-1, 1023-2 and 1023-3 are connected to an output stage of the 5-port junction circuit 1022C.

Thus, the 5-port junction circuit 1022B has five ports, i.e., two ports serving as the first input terminal $T_{IN1}$ and the second input terminal $T_{IN2}$, as well as three ports serving as an output terminal of the coupler 401 connected to the power detecting circuit 1023-1, an output terminal of the branch circuit 402 connected to the power detecting circuit 1023-2 and an output terminal of the branch circuit 403 connected to the power detecting circuit 1023-3.

Note that, in the 5-port junction circuit 1022C of FIG. 7, the coupler 401, the branch circuits 402, 403, and the phase shifter 404 constitute generating means.

In the 5-port junction circuit 1022C, the combined received signal RS or the calibration signal CS inputted to the first input terminal $T_{IN1}$ is applied to the branch circuit 402 through the coupler 401, and a part of the input signal is applied to the power detecting circuit 1023-1 from the coupler 401.

The received signal applied to the branch circuit 402 is branched into two signals. One of the branched signals is inputted to the power detecting circuit 1023-2, and the other branched signal is inputted to the phase shifter 404.

The phase shifter 404 gives a phase shift θ to the input signal from the branch circuit 402. The signal having the shifted phase is inputted to the branch circuit 403 and branched into two signals. One of the branched signals from the branch circuit 403 is inputted to the power detecting circuit 1023-3, and the other branched signal is supplied to the second input terminal $T_{IN2}$.

Also, the local signal LS inputted to the second input terminal $T_{IN2}$ is applied to the branch circuit 403 and branched into two signals. One of the branched signals is inputted to the power detecting circuit 1023-3, and the other branched signal is inputted to the phase shifter 404.

The phase shifter 404 gives a phase shift θ to the local signal from the branch circuit 403. The signal having the shifted phase is inputted to the branch circuit 402 and branched into two signals. One of the branched signals from the branch circuit 402 is inputted to the power detecting circuit 1023-2, and the other branched signal is supplied to the coupler 401.

With the above arrangement, the received signal is supplied to the power detecting circuit 1023-1. The power detecting circuit 1023-1 detects the amplitude component of the signal supplied to it. The detected signal is converted by the A/D conversion circuit 1024-1 from the analog to digital form, and is supplied to the multi-port IQ signal conversion circuit 1025.

The received signal and the local signal given with the phase shift θ are supplied to the power detecting circuit 1023-2. The power detecting circuit 1023-2 detects the amplitude components of the signals supplied to it. The detected signals are converted by the A/D conversion circuit 1024-2 from the analog to digital form, and are supplied to the multi-port IQ signal conversion circuit 1025.

Further, the local signal and the received signal given with the phase shift θ are supplied to the power detecting circuit 1023-3. The power detecting circuit 1023-3 detects the amplitude components of the signals supplied to it. The detected signals are converted by the A/D conversion circuit 1024-3 from the analog to digital form, and are supplied to the multi-port IQ signal conversion circuit 1025.

In the conversion circuit 1025, the input signals are converted to and outputted as demodulated signals, i.e., an in-phase signal I and a quadrature signal Q.

Figure 8:
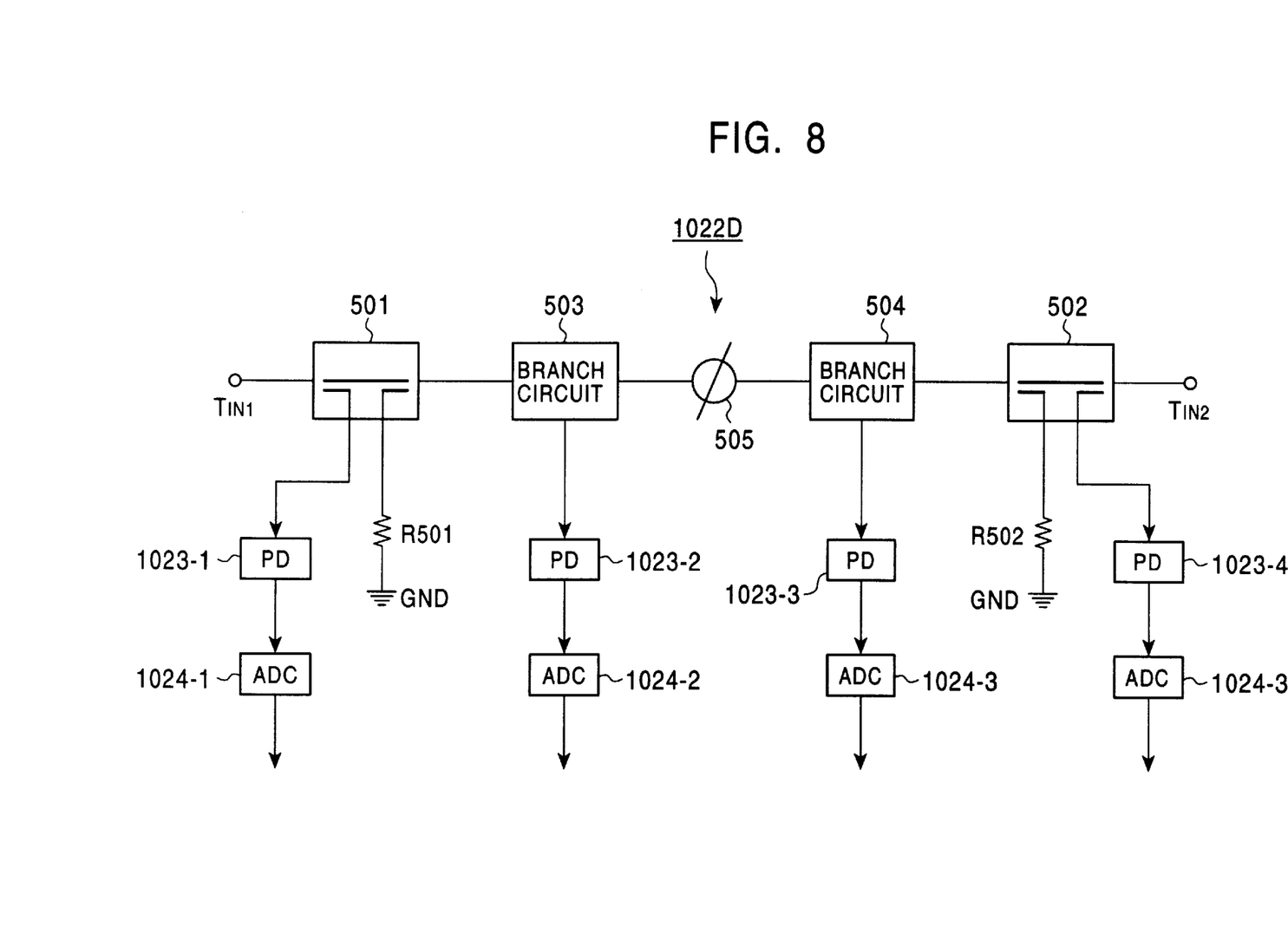
FIG. 8 is a circuit diagram showing one example of configuration of a 6-port junction circuit according to the present invention.

FIG. 8 is a circuit diagram showing one example of configuration of a 6-port junction circuit.

A 6-port junction circuit 1022D of FIG. 8 has a first input terminal $T_{IN1}$ for a received signal or a calibration signal, and a second input terminal $T_{IN2}$ for a local signal. Also, the 6-port junction circuit 1022C comprises couplers 501, 502, branch circuits 503, 504, and a phase shifter 505. In this case, four power detecting circuit 1023-1, 1023-2, 1023-3 and 1023-4 are connected to an output stage of the 6-port junction circuit 1022D.

Thus, the 6-port junction circuit 1022B has sixth ports, i.e., two ports serving as the first input terminal $T_{IN1}$ and the second input terminal $T_{IN2}$, as well as four ports serving as an output terminal of the coupler 501 connected to the power detecting circuit 1023-1, an output terminal of the branch circuit 503 connected to the power detecting circuit 1023-2, an output terminal of the branch circuit 504 connected to the power detecting circuit 1023-3, and an output terminal of the coupler 502 connected to the power detecting circuit 1023-4.

Note that, in the 6-port junction circuit 1022D of FIG. 8, the couplers 501, 502, the branch circuits 503, 504, and the phase shifter 505 constitute generating means.

In the 6-port junction circuit 1022D, the combined received signal RS or the calibration signal CS inputted to the first input terminal $T_{IN1}$ is applied to the branch circuit 503 through the coupler 501, and a part of the input signal is applied to the power detecting circuit 1023-1 from the coupler 501.

The received signal applied to the branch circuit 503 is branched into two signals. One of the branched signals is inputted to the power detecting circuit 1023-2, and the other branched signal is inputted to the phase shifter 505.

The phase shifter 505 gives a phase shift θ to the input signal from the branch circuit 503. The signal having the shifted phase is inputted to the branch circuit 504 and branched into two signals. One of the branched signals from the branch circuit 504 is inputted to the power detecting circuit 1023-3, and the other branched signal is supplied to the coupler 502.

A part of the input signal to the coupler 502 is supplied to the second input terminal $T_{IN2}$.

Also, the local signal LS inputted to the second input terminal $T_{IN2}$ is applied to the branch circuit 504 through the coupler 502, and a part of the local signal is inputted to the power detecting circuit 1023-4.

The local signal applied to the branch circuit 504 is branched into two signals. One of the branched signals is inputted to the power detecting circuit 1023-3, and the other branched signal is inputted to the phase shifter 505.

The phase shifter 505 gives a phase shift θ to the local signal from the branch circuit 504. The signal having the shifted phase is inputted to the branch circuit 503 and branched into two signals. One of the branched signals from the branch circuit 503 is inputted to the power detecting circuit 1023-2, and the other branched signal is supplied to the coupler 501.

With the above arrangement, the received signal or the calibration signal is supplied to the power detecting circuit 1023-1. The power detecting circuit 1023-1 detects the amplitude component of the signal supplied to it. The detected signal is converted by the A/D conversion circuit 1024-1 from the analog to digital form, and is supplied to the multi-port IQ signal conversion circuit 1025.

The received signal or the calibration signal and the local signal given with the phase shift θ are supplied to the power detecting circuit 1023-2. The power detecting circuit 1023-2 detects the amplitude components of the signals supplied to it. The detected signals are converted by the A/D conversion circuit 1024-2 from the analog to digital form, and are supplied to the multi-port IQ signal conversion circuit 1025.

The local signal and the received signal or the calibration signal, which is given with the phase shift θ, are supplied to the power detecting circuit 1023-3. The power detecting circuit 1023-3 detects the amplitude components of the signals supplied to it. The detected signals are converted by the A/D conversion circuit 1024-3 from the analog to digital form, and are supplied to the multi-port IQ signal conversion circuit 1025.

Further, the local signal is supplied to the power detecting circuit 1023-4. The power detecting circuit 1023-4 detects the amplitude component of the signal supplied to it. The detected signal is converted by the A/D conversion circuit 1024-4 from the analog to digital form, and is supplied to the multi-port IQ signal conversion circuit 1025.

In the conversion circuit 1025, the input signals are converted to and outputted as demodulated signals, i.e., an in-phase signal I and a quadrature signal Q.

In the reception mode, the multi-port IQ signal conversion circuit 1025 converts the digital detected signal from the power detecting circuit to a plurality of signal components contained in the received signal or the local signal, i.e., an in-phase signal I and a quadrature signal Q as demodulated signals, in accordance with the set values of circuit constants including circuit parameters of the multi-port junction circuit 1022. In the non-reception mode in which signals are not received, the conversion circuit 1025 determines values of the circuit parameters based on the digital detected signal from the power detecting circuits, and corrects the circuit constants to the determined values.

The processing executed by the multi-port IQ signal conversion circuit 1025 in the non-reception mode will be described below in more detail on an assumption that the multi-port junction circuit is a 5-port junction circuit.

The detected signals $P_1$, $P_2$ and $P_3$ of the power detecting circuits 1023-1 to 1023-3 are converted in the multi-port IQ signal conversion circuit 1025 to the in-phase signal I(t) and the quadrature signal Q(t), as demodulated signals, based on the following formulae (1) and (2):

$$I(t)=h_{i0}+h_{i1}P_1+h_{i2}P_2+h_{i3}P_3 \tag{1}$$

$$Q(t)=h_{q0}+h_{q1}P_1+h_{q2}P_2+h_{q3}P_3 \tag{2}$$

Assuming that the phase shifters 10143, 10144 and 10145 of the phase varying circuit 1014-1 give phase shifts of θ=π/2, π and 3π/2, respectively, the following simultaneous equations are derived:

$$I(\theta=0)=h_{i0}+h_{i1}P_1(\theta=0)+h_{i2}P_2(\theta=0)+h_{i3}P_3(\theta=0) \tag{3}$$

$$Q(\theta=0)=h_{q0}+h_{q1}P_1(\theta=0)+h_{q2}P_2(\theta=0)+h_{q3}P_3(\theta=0) \tag{4}$$

$$I(\theta=\pi/2)=h_{i0}+h_{i1}P_1(\theta=\pi/2)+h_{i2}P_2(\theta=\pi/2)+h_{i3}P_3(\theta=\pi/2) \tag{5}$$

$$Q(\theta=\pi/2)=h_{q0}+h_{q1}P_1(\theta=\pi/2)+h_{q2}P_2(\theta=\pi/2)+h_{q3}P_3(\theta=\pi/2) \tag{6}$$

$$I(\theta=\pi)=h_{i0}+h_{i1}P_1(\theta=\pi)+h_{i2}P_2(\theta=\pi)+h_{i3}P_3(\theta=\pi) \tag{7}$$

$$Q(\theta=\pi)=h_{q0}+h_{q1}P_1(\theta=\pi)+h_{q2}P_2(\theta=\pi)+h_{q3}P_3(\theta=\pi) \quad (8)$$

$$I(\theta=3\pi/2)=h_{i0}+h_{i1}P_1(\theta=3\pi/2)+h_{i2}P_2(\theta=3\pi/2)+h_{i3}P_3(\theta=3\pi/2) \quad (9)$$

$$Q(\theta=3\pi/2)=h_{q0}+h_{q1}P_1(\theta=3\pi/2)+h_{q2}P_2(\theta=3\pi/2)+h_{q3}P_3(\theta=3\pi/2) \quad (10)$$

The values of circuit parameters $h_{i0}$, $h_{i1}$, $h_{i2}$, $h_{i3}$, $h_{q0}$, $h_{q1}$, $h_{q2}$ and $h_{q3}$ of the multi-port junction circuit 1022 are calculated from the above simultaneous equations.

In accordance with the circuit parameters $h_{i0}$, $h_{i1}$, $h_{i2}$, $h_{i3}$, $h_{q0}$, $h_{q1}$, $h_{q2}$ and $h_{q3}$ thus calculated, the multi-port IQ signal conversion circuit 1025 corrects the set circuit parameters, which are employed in the reception mode, and then executes the conversion using the corrected circuit parameters in the receiving operation after that.

The carrier reproducing circuit 1026 reproduces a carrier signal based on the demodulated signals from the multi-port IQ signal conversion circuit 1025.

The switch control section 103 comprises a first switch circuit (SPDT RF switch circuit) 1031, a second switch circuit 1032, a third switch circuit 1033, and a control circuit 1034.

The first switch circuit 1031 has a first terminal a connected to an output terminal of the RF amplifier 1013-1 which is cascaded to the antenna element 1011-1 corresponding to the phase varying circuit 1014-1, a second terminal b connected to a local signal output terminal of the local signal generating circuit 1021, and a third terminal c connected to an input terminal of the phase varying circuit 1014-1. The first switch circuit 1031 is changed over in response to a control signal CTL1 from the control circuit 1034 such that the third terminal c is selectively connected to the first terminal a or the second terminal b.

The second switch circuit 1032 has a first terminal a connected to one input terminal of the signal combiner 1015, a second terminal b, and a third terminal c connected to an output terminal of the phase varying circuit 1014-1. The second switch circuit 1032 is changed over in response to the control signal CTL1 from the control circuit 1034 such that the third terminal c is selectively connected to the first terminal a or the second terminal b.

The third switch circuit 1033 has a first terminal a connected to an output terminal of the signal combiner 1015, a second terminal b connected to second terminal b of the second switch circuit 1032, and a third terminal c connected to the first input terminal $T_{IN1}$ of the multi-port junction circuit 1022. The third switch circuit 1033 is changed over in response to the control signal CTL1 from the control circuit 1034 such that the third terminal c is selectively connected to the first terminal a or the second terminal b.

In the reception mode, the control circuit 1034 controls the first switch circuit 1031, the second switch circuit 1032 and the third switch circuit 1033 by the control signal CTL1 such that the third terminal c is connected to the first terminal a. In the non-reception mode, the control circuit 1034 controls the first switch circuit 1031, the second switch circuit 1032 and the third switch circuit 1033 by the control signal CTL1 such that the third terminal c is connected to the second terminal b.

Also, in the reception mode, the control circuit 1034 performs control by a control signal CTL2 such that the phase varying circuits 1014-1 to 1014-m vary the phases of the received signals at values different values from one another.

Further, in the non-reception mode, the control circuit 1034 performs control by the control signal CTL2 such that the phase of the local signal LS, which is inputted to the phase varying circuit 1014-1 functioning as a calibration circuit, differs from the phase of the local signal LS supplied to the multi-port junction circuit 1022.

Additionally, the reception mode and the non-reception mode are changed over at periodic time intervals using, e.g., a timer.

The operation of the receiver thus constructed will be described below.

When the receiver is in the reception mode, the first switch circuit 1031, the second switch circuit 1032 and the third switch circuit 1033 are controlled by the control signal CTL1 from the control circuit 1034 such that the third terminal c is connected to the first terminal a.

Accordingly, the output terminal of the RF amplifier 1013-1 is connected to the input terminal of the phase varying circuit 1014-1, the output terminal of the phase varying circuit 1014-1 is connected to one input terminal of the signal combiner 1015, and the output terminal of the signal combiner 1015 is connected to the first input terminal $T_{IN1}$ of the multi-port junction circuit 1022.

With such an arrangement, in the reception mode, signals received by the antenna elements 1011-1 to 1011-m of the phased array antenna section 101 pass respectively the preselect filters 1012-1 to 1012-m, the RF amplifiers 1013-1 to 1013-m and the phase varying circuits 1014-1 to 1014-m, which are cascaded to the antenna elements 1011-1 to 1011-m. The received signals are then combined by the signal combiner 1015.

At this time, the phase varying circuits 1014-1 to 1014-m of the phased array antenna section 2 are controlled by the control signal CTL2 from the control circuit 1034 so as to change the phases of the received signals at values different from one another.

The combined received signal RS combined by and outputted from the signal combiner 1015 is inputted to the first input terminal $T_{IN1}$ of the multi-port junction circuit 1022 in the multi-port direct conversion demodulating section 102.

Also, the local signal LS of predetermined frequency generated by the local signal generating circuit 1021 is inputted to the second input terminal $T_{IN2}$ of the multi-port junction circuit 1022.

In the multi-port junction circuit 1022, at least two signals having a phase difference between them are generated based on the combined received signal RS and the local signal LS. Then, the combined received signal RS, the local signal LS, and the generated signals are supplied to the power detecting circuits 1023-1 to 1023-k.

In the power detecting circuits 1023-1 to 1023-k, the signal levels, i.e., the amplitude components, of the input signals are detected, and resulting detected signals $P_1$ to $P_k$ are converted by the A/D conversion circuits 1024-1 to 1024-k from the analog to digital form and then supplied to the multi-port IQ signal conversion circuit 1025.

The multi-port IQ signal conversion circuit 1025 demodulates the input detected signals to obtain signal components, i.e., an in-phase signal I and a quadrature signal Q, which are contained in the received signal, based on the values of circuit constants (parameters) including circuit parameters of the multi-port junction circuit 1022. The resulting demodulated signals are then supplied to the carrier reproducing circuit 1026.

In the carrier reproducing circuit 1026, a carrier signal having the same frequency as that set by the local signal generating circuit 1021 is reproduced.

On the other hand, when calculating the values of circuit parameters of the multi-port junction circuit 1022, i.e., in the non-reception mode, the first switch circuit 1031, the second switch circuit 1032 and the third switch circuit 1033 are controlled by the control signal CTL1 from the control circuit 1034 such that the third terminal c is connected to the second terminal b.

Accordingly, the local signal output terminal of the local signal generating circuit 1021 is connected to the input terminal of the phase varying circuit 1014-1, and the output terminal of the phase varying circuit 1014-1 is connected to the first input terminal $T_{IN1}$ of the multi-port junction circuit 1022.

With such an arrangement, an output signal of the phase varying circuit 1014-1 is supplied as a calibration signal CS to the first input terminal $T_{IN1}$ of the multi-port junction circuit 1022 instead of the combined received signal RS.

In this case, the local signal LS generated by the local signal generating circuit 1021 is inputted to the phase varying circuit 1014-1.

The local signal LS is also supplied to the second input terminal $T_{IN2}$ of the multi-port junction circuit 1022.

In the phase varying circuit 1014-1, the calibration signal CS having a phase different from that of the local signal LS, inputted to the multi-port junction circuit 1022, is generated in response to the control signal CTL2 of the control circuit 1034, and then supplied to the first input terminal $T_{IN1}$ of the multi-port junction circuit 1022 through the second switch circuit 1032 and the third switch circuit 1033.

In the multi-port junction circuit 1022, at least two signals having a phase difference between them are generated based on the calibration signal CS and the local signal LS. Then, the calibration signal CS, the local signal LS, and the generated signals are supplied to the power detecting circuits 1023-1 to 1023-$k$.

In the power detecting circuits 1023-1 to 1023-$k$, the signal levels, i.e., the amplitude components, of the input signals are detected, and resulting detected signals $P_1$ to $P_k$ are converted by the A/D conversion circuits 1024-1 to 1024-$k$ from the analog to digital form and then supplied to the multi-port IQ signal conversion circuit 1025.

In the multi-port IQ signal conversion circuit 1025, the values of circuit parameters $h_{ik}$, $h_{qk}$ of the multi-port junction circuit 1022 are calculated with predetermined simultaneous equations by comparing two signals having different phases with each other. The circuit parameters having been set so far are corrected in accordance with the calculated circuit parameters $h_{ik}$, $h_{qk}$.

After that time, the conversion in the reception mode is executed using the corrected circuit parameters.

With the second embodiment, as described above, the switch control section 103 is provided to perform control such that the input terminal of the phase varying circuit 1014-1 is selectively connected through the first switch circuit 1031 to any of the output terminal of the RF amplifier 1013-1 and the local signal output terminal of the local signal generating circuit 1021, whereby one 1014-1 of the m pieces of phase varying circuits 1014-1 to 1014-$m$ in the phased array antenna section 101, which is connected to the line cascaded to the antenna element 1011-1, serves as a calibration circuit in the calibration processing that is executed in the non-reception mode. Also, the output terminal of the phase varying circuit 1014-1 is selectively connected through the second switch circuit 1032 or the third switch circuit 1033 to any of one input terminal of the signal combiner 1015 and the first input terminal of the multi-port junction circuit 1022 in the multi-port direct conversion demodulating section 102. It is therefore possible to prevent an increase in the receiver size and to realize a cost reduction.

Also, since the receiver includes the phase varying circuit which also functions as a calibration circuit, frequency changes, temperature-dependent changes, and changes over time of internal parameters of a multi-port direct conversion circuit can be compensated for through self-calibration.

What is claimed is:

1. A receiver comprising:
a phased array antenna section including a plurality of antenna elements each receiving a radio signal, a plurality of phase varying circuits for controlling phases of the respective signals received by said antenna elements to desired different phases, and a signal combiner for combining output signals of said plurality of phase varying circuits;
a direct conversion demodulating section including a local signal generating circuit for generating a local signal of predetermined frequency, generating means for receiving a combined received signal, which is supplied from said signal combiner of said phased array antenna section, or a calibration signal and the local signal from said local signal generating circuit, for generating two signals having a phase difference therebetween based on at least one of the signals received by said generating means, and for outputting at least one signal, at least one power detecting circuit for receiving the signal outputted from said generating means and detecting a level of the signal received from the same, and a conversion circuit for, in a reception mode, converting the output signal of said power detecting circuit to a plurality of signal components, which are contained in the received signal or the local signal, based on set values of circuit parameters, and for, in a non-reception mode in which signals are not received, determining the values of said circuit parameters based on the output signal of said power detecting circuit and then correcting said circuit parameters to the determined values; and
a switch circuit for, in the reception mode, applying the combined received signal outputted from said signal combiner of said phased array antenna section to said direct conversion demodulating section, and for, in the non-reception mode, applying the calibration signal to said direct conversion demodulating section instead of the combined received signal outputted from said signal combiner of said phased array antenna section.

2. A receiver according to claim 1, wherein said local signal generating circuit sets a level of the local signal based on an output signal of said conversion circuit.

3. A receiver according to claim 1, wherein said direct conversion demodulating section further includes a reproducing circuit for reproducing a carrier signal, which has the same frequency as that set by said local signal generating circuit, based on converted signals from said conversion circuit.

4. A receiver according to claim 2, wherein said direct conversion demodulating section further includes a reproducing circuit for reproducing a carrier signal, which has the same frequency as that set by said local signal generating circuit, based on converted signals from said conversion circuit.

5. A receiver comprising:
a phased array antenna section including a plurality of antenna elements each receiving a radio signal, a plurality of phase varying circuits for controlling phases of the respective signals received by said antenna elements to desired different phases, and a signal combiner for combining output signals of said plurality of phase varying circuits;

a direct conversion demodulating section including a local signal generating circuit for generating a local signal of predetermined frequency, generating means for receiving a combined received signal, which is supplied from said signal combiner of said phased array antenna section, or a calibration signal and the local signal from said local signal generating circuit, for generating two signals having a phase difference therebetween based on at least one of the signals received by said generating means, and for outputting at least one signal, at least one power detecting circuit for receiving the signal outputted from said generating means and detecting a level of the signal received from the same, and a conversion circuit for, in a reception mode, converting the output signal of said power detecting circuit to a plurality of signal components, which are contained in the received signal or the local signal, based on set values of circuit parameters, and for, in a non-reception mode in which signals are not received, determining the values of said circuit parameters based on the output signal of said power detecting circuit and then correcting said circuit parameters to the determined values; and a switch control section for, in the non-reception mode, applying the local signal from said local signal generating circuit of said direct conversion demodulating section to one of said plurality of phase varying circuits of said phased array antenna section instead of the received signal from the antenna element corresponding to said one phase varying circuit, for setting a phase of the local signal, which is inputted to said one phase varying circuit, to a predetermined phase, and for applying the signal having been set to the predetermined phase, as the calibration signal, to said generating means of said direct conversion demodulating section instead of the combined received signal outputted from said signal combiner of said phased array antenna section.

6. A receiver according to claim 5, wherein said switch control section includes a control circuit for, at least in the non-reception mode, controlling said one phase varying circuit to set the phase of the local signal inputted thereto to be different from the phase of the local signal inputted to said generating means.

7. A receiver according to claim 5, wherein said switch control section comprises:

a first switch circuit having a first terminal connected to an output line of the antenna element corresponding to said one phase varying circuit, a second terminal connected to a local signal output terminal of said local signal generating circuit, and a third terminal connected to an input terminal of said one phase varying circuit, said first switch circuit selectively connecting the third terminal to the first terminal or the second terminal in response to a control signal;

a second switch circuit having a first terminal connected to one input terminal of said signal combiner, a second terminal, and a third terminal connected to an output terminal of said one phase varying circuit, said second switch circuit selectively connecting the third terminal to the first terminal or the second terminal in response to the control signal;

a third switch circuit having a first terminal connected to an output terminal of said signal combiner, a second terminal connected to the second terminal of said second switch circuit, and a third terminal connected to an input terminal of said generating means, said third switch circuit selectively connecting the third terminal to the first terminal or the second terminal in response to the control signal; and a control circuit for, in the reception mode, controlling each of said first switch circuit, said second switch circuit and said third switch circuit by the control signal such that the third terminal is connected to the first terminal, and for, in the non-reception mode, controlling each of said first switch circuit, said second switch circuit and said third switch circuit by the control signal such that the third terminal is connected to the second terminal.

8. A receiver according to claim 7, wherein at least in the non-reception mode, said control circuit controls said one phase varying circuit to set the phase of the local signal inputted thereto to be different from the phase of the local signal inputted to said generating means.

9. A receiver according to claim 5, wherein said local signal generating circuit sets a level of the local signal based on an output signal of said conversion circuit.

10. A receiver according to claim 6, wherein said local signal generating circuit sets a level of the local signal based on an output signal of said conversion circuit.

11. A receiver according to claim 5, wherein said direct conversion demodulating section further includes a reproducing circuit for reproducing a carrier signal, which has the same frequency as that set by said local signal generating circuit, based on converted signals from said conversion circuit.

12. A receiver according to claim 6, wherein said direct conversion demodulating section further includes a reproducing circuit for reproducing a carrier signal, which has the same frequency as that set by said local signal generating circuit, based on converted signals from said conversion circuit.

* * * * *